United States Patent
Lv et al.

(10) Patent No.: US 9,778,514 B2
(45) Date of Patent: Oct. 3, 2017

(54) DISPLAY PANEL AND DISPLAY DEVICE COMPRISING A VOLUME-VARIABLE STRUCTURE HAVING A PLURALITY OF VOLUME-VARIABLE MICROCAPSULES

(71) Applicants: Boe Technology Group Co., Ltd., Beijing (CN); Hefei Xinsheng Optoelectronics Technology Co., Ltd., Anhui (CN)

(72) Inventors: Kui Lv, Beijing (CN); Fengzhen Lv, Beijing (CN); Xinxia Zhang, Beijing (CN); Xiao Guo, Beijing (CN); Kang Xiang, Beijing (CN); Wenjin Fan, Beijing (CN); Chen Wang, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 14/500,207

(22) Filed: Sep. 29, 2014

(65) Prior Publication Data

US 2015/0362783 A1 Dec. 17, 2015

(30) Foreign Application Priority Data

Jun. 11, 2014 (CN) .......................... 2014 1 0259158

(51) Int. Cl.
G02F 1/1339 (2006.01)

(52) U.S. Cl.
CPC ........ *G02F 1/13394* (2013.01); *G02F 1/1339* (2013.01); *G02F 2001/13398* (2013.01); *G02F 2201/503* (2013.01)

(58) Field of Classification Search
CPC ................ G02F 2001/13398; G02F 2201/503
(Continued)

(56) References Cited

U.S. PATENT DOCUMENTS

| 6,507,385 | B1 * | 1/2003 | Nishiyama | G02F 1/13394 |
|---|---|---|---|---|
| | | | | 349/156 |
| 2002/0033927 | A1 * | 3/2002 | Mun | G02F 1/133707 |
| | | | | 349/156 |

(Continued)

FOREIGN PATENT DOCUMENTS

| CN | 101493611 | 7/2009 |
|---|---|---|
| CN | 101666946 | 3/2010 |

(Continued)

OTHER PUBLICATIONS

Office action from Chinese Application No. 201410259158.0 dated Mar. 21, 2016.

*Primary Examiner* — Paul Lee

(74) *Attorney, Agent, or Firm* — Calfee, Halter & Griswold LLP

(57) ABSTRACT

A display panel includes a first substrate, a second substrate, and a liquid crystal layer between the first substrate and the second substrate. A volume-variable structure is arranged between the first substrate and the second substrate. The volume-variable structure effectively reduces the requirement on the deformation capacity of the spacer due to the liquid crystal margin, which is favorable for improving the surface strength of the display panel. The display panel can be used in a display device.

11 Claims, 4 Drawing Sheets

(58) Field of Classification Search
USPC .................................................. 349/155–157
See application file for complete search history.

(56) References Cited

U.S. PATENT DOCUMENTS

| | | | |
|---|---|---|---|
| 2005/0031858 A1* | 2/2005 | Tachibana | C09J 7/0246 |
| | | | 428/343 |
| 2006/0203179 A1* | 9/2006 | Kawase | G02F 1/167 |
| | | | 349/187 |
| 2007/0153214 A1* | 7/2007 | Park | G02F 1/13394 |
| | | | 349/155 |
| 2009/0231516 A1* | 9/2009 | Okada | G02F 1/1339 |
| | | | 349/73 |

FOREIGN PATENT DOCUMENTS

| | | |
|---|---|---|
| CN | 102636899 | 8/2012 |
| EP | 640863 | 3/1995 |
| JP | 08179284 A * | 7/1996 |

* cited by examiner

DISPLAY PANEL AND DISPLAY DEVICE COMPRISING A VOLUME-VARIABLE STRUCTURE HAVING A PLURALITY OF VOLUME-VARIABLE MICROCAPSULES

RELATED APPLICATIONS

The present application claims the benefit of Chinese Patent Application No. 201410259158.0, filed Jun. 11, 2014, the entire disclosure of which is incorporated herein by reference.

FIELD

The present disclosure relates to the field of display technology, and particularly to a display panel and a display device.

BACKGROUND

A liquid crystal display has advantages of small volume, low power consumption, low radiation output, etc., and has been widely applied in devices such as computer displays, laptops, mobile phones, liquid crystal televisions, and so on.

The liquid crystal display comprises a color film substrate, an array substrate, and a liquid crystal layer arranged between the two substrates, wherein the color film substrate and the array substrate are arranged in parallel and opposite to each other, and wherein the thickness (i.e., cell thickness) of the liquid crystal layer is controlled by a spacer arranged between the two substrates. Specifically, during the process of manufacturing the liquid crystal display, a deformable spacer is generally used to control the liquid crystal margin (LC Margin) in order to adjust the corresponding relation between the cell volume of the panel and the filled liquid crystal amount. The good deformation capacity of the spacer can effectively provide a relatively broader LC Margin. However, the surface strength (corresponding to Pogo) of the liquid crystal display requires that the spacer has good supporting capacity, which is contrary to the deformation capacity requirement of the spacer needed for the liquid crystal margin. Thus, if the spacer has good deformation capacity, it will be unfavorable for improvement of the surface strength of the display panel.

SUMMARY

The present disclosure provides a display panel which can reduce the requirement on the deformation capacity of the spacer, which is favorable for improving the surface strength of the display panel.

In an exemplary embodiment of the present disclosure, a display panel comprises a first substrate, a second substrate, and a liquid crystal layer between the first substrate and the second substrate, wherein a volume-variable structure is arranged between the first substrate and the second substrate.

According to an exemplary embodiment, the display panel further comprises a sealant structure for sealing the liquid crystal layer between the first substrate and the second substrate, the volume-variable structure being arranged between the liquid crystal layer and the sealant structure.

According to an exemplary embodiment, the volume-variable structure comprises a plurality of volume-variable microcapsules, each of the microcapsules comprising a housing and a filling within the housing.

According to an exemplary embodiment, the material of the housing is any one of the following: a thermoplastic polyurethane elastomer, a natural latex, and a natural rubber.

According to an exemplary embodiment, the filling is any one of the following: a gas, a liquid, and a gas-liquid mixture.

According to an exemplary embodiment, the gas is any one or mixture of at least two of the following: an inert gas, nitrogen, and carbon dioxide.

According to an exemplary embodiment, the microcapsules are fixed on the first substrate, the second substrate, or the sealant structure.

According to an exemplary embodiment, the microcapsules are spheres, having a diameter of 0.1 μm-10 μm.

According to an exemplary embodiment, a spacer is arranged between the first substrate and the second substrate.

In another exemplary embodiment of the present disclosure, a display device comprises a display panel as disclosed or suggested herein.

The general inventive concepts of the present disclosure relate to a volume-variable structure provided between the first substrate and the second substrate, the volume of which varies with the variation of the pressure intensity within the cell-to-cell structure consisting of the first substrate and the second substrate. When the amount of liquid crystal within the cell-to-cell structure is less (i.e., the LC Margin is negative), the pressure intensity within the cell-to-cell structure will be less affected by the supporting function of the spacer, such that the volume-variable structure will expand and its volume will become larger, thereby reducing the space within the cell-to-cell structure, preventing a bubble phenomenon, and ensuring the cell gap of the effective display area. When the amount of liquid crystal within the cell-to-cell structure is greater (i.e., the LC Margin is positive), the pressure intensity within the cell-to-cell structure will be greater, such that the volume-variable structure will shrink and its volume will become smaller, thereby providing extra space within the cell-to-cell structure to accommodate the excess liquid crystal, preventing a color nonuniformity (gravity Mura) phenomenon, and ensuring the cell gap of the effective display area. In this manner, the volume-variable structure effectively reduces the requirement on the deformation capacity of the spacer due to the liquid crystal margin, which is favorable for improving the surface strength of the display panel.

DETAILED DESCRIPTION

The present invention and associated general inventive concepts will be further described hereinafter in detail with reference to the accompanying drawings and various exemplary embodiments. One of ordinary skill in the art will appreciate that these exemplary embodiments only constitute a fraction of the possible embodiments encompassed by the present invention and associated general inventive concepts. As such, the scope of the present disclosure is by no means limited to the exemplary embodiments set forth herein.

In an exemplary embodiment, a display panel comprises a first substrate, a second substrate, and a liquid crystal layer between the first substrate and the second substrate, wherein a volume-variable structure is arranged between the first substrate and the second substrate.

In an exemplary embodiment, the first substrate is a color film substrate, and the second substrate is an array substrate. Alternatively, the first substrate may be an array substrate, and the second substrate may be a color film substrate.

In an exemplary embodiment, the volume of the volume-variable structure varies in accordance with the pressure intensity within the cell-to-cell structure consisting of the first substrate and the second substrate. When the amount of liquid crystal within the cell-to-cell structure is lower (i.e., the LC Margin is negative), the pressure intensity within the cell-to-cell structure will be less affected by the supporting function of the spacer, such that the volume-variable structure will expand and its volume will become larger, thereby reducing the space within the cell-to-cell structure, preventing the bubble phenomenon, and ensuring the cell gap of the effective display area. When the amount of liquid crystal within the cell-to-cell structure is greater (i.e., the LC Margin is positive), the pressure intensity within the cell-to-cell structure will be greater, such that the volume-variable structure will shrink and its volume will become smaller, thereby providing extra space within the cell-to-cell structure to fill the excess liquid crystal, preventing a color nonuniformity (gravity Mura) phenomenon, and ensuring the cell gap of the effective display area. In this manner, the volume-variable structure effectively reduces the requirement on the deformation capacity of the spacer due to the liquid crystal margin, which is favorable for improving the surface strength of the display panel.

Figure 1:
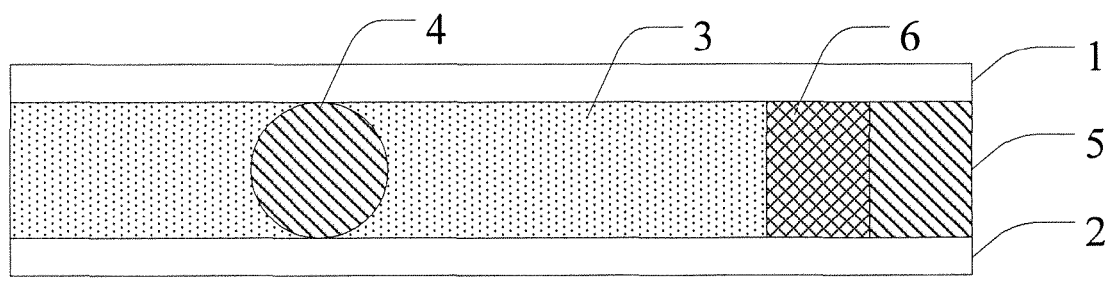
FIG. 1 is a schematic view of a display panel, according to an exemplary embodiment.

Referring to FIG. 1, a display panel, according to an exemplary embodiment, comprises a first substrate 1 as a color film substrate and a second substrate 2 as an array substrate. A spacer 4 and a liquid crystal layer 3 are arranged between the first substrate 1 and the second substrate 2. A sealant structure 5 seals the liquid crystal layer 3 between the first substrate 1 and the second substrate 2. A volume-variable structure 6 is further arranged between the first substrate and the second substrate, and the volume-variable structure 6 is arranged between the liquid crystal layer 3 and the sealant structure 5.

Figure 2:
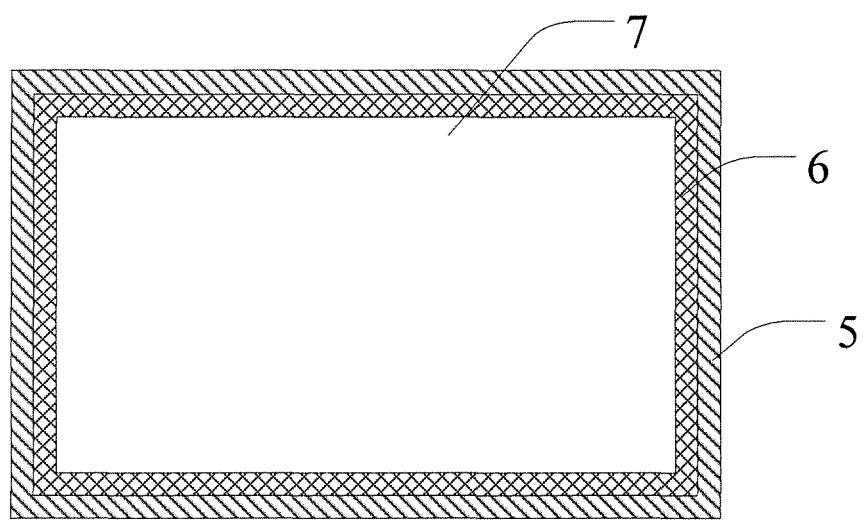
FIG. 2 is a vertical view of the display panel as shown in FIG. 1, according to an exemplary embodiment.

Referring to FIG. 2, in a display panel, according to an exemplary embodiment, the volume-variable structure 6 is arranged between the liquid crystal layer 3 and the sealant structure 5, i.e., is arranged inside the sealant structure 5 at the periphery of an effective display area 7 of the display panel. When the amount of liquid crystal within the cell-to-cell structure is lower (i.e., the LC Margin is negative), the pressure intensity within the cell-to-cell structure will be less affected by the supporting function of the spacer, and the volume-variable structure will expand and its volume will become larger, such that the liquid crystal located at the periphery of the display panel can be pressed into the effective display area 7 of the display panel, preventing the bubble phenomenon, and ensuring the cell gap in the effective display area. When the amount of liquid crystal within the cell-to-cell structure is greater (i.e., the LC Margin is positive), the pressure intensity within the cell-to-cell structure will be greater, and the volume-variable structure will shrink and its volume will become smaller, such that the excess liquid crystal in the effective display area 7 can be absorbed into the peripheral area of the display panel, preventing the color nonuniformity (gravity Mura) phenomenon, and ensuring the cell gap of the effective display area. Thus, as noted above, the requirement on the deformation capacity of the spacer due to the liquid crystal margin can be reduced effectively, which is favorable for improving the surface strength of the display panel.

Figure 3:
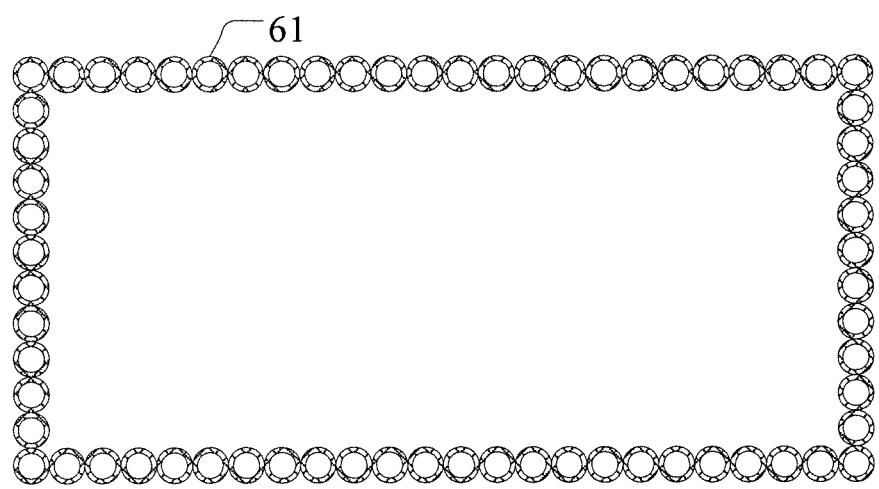
FIG. 3 is a schematic view of a volume-variable structure, according to an exemplary embodiment.

Referring to FIG. 3, a volume-variable structure 6, according to an exemplary embodiment, is a microcapsule cluster comprising a plurality of volume-variable microcapsules 61, wherein the volume of each microcapsule varies with the variation of the pressure intensity within the cell-to-cell structure. When the pressure intensity within the cell-to-cell structure becomes larger, the volume of the microcapsules 61 is reduced. Conversely, when the pressure intensity within the cell-to-cell structure is reduced, the volume of the microcapsules 61 is increased.

The microcapsules 61 may have any suitable shape such as a cube, a sphere, etc. In an exemplary embodiment, the shape of the microcapsule is a sphere, and the diameter of the microcapsule is within 0.1 μm-10 μm.

Figure 4:
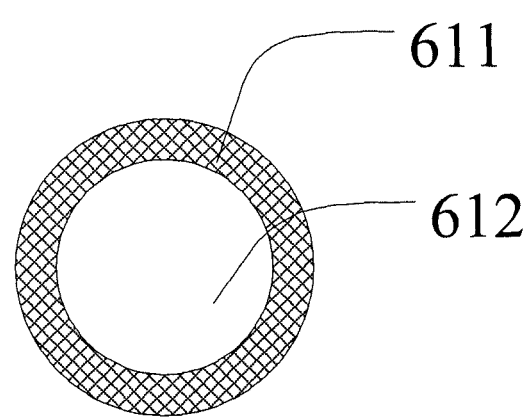
FIG. 4 is a schematic view of a microcapsule, according to an exemplary embodiment.

Referring to FIG. 4, a cross-sectional view of a microcapsule, according to an exemplary embodiment, is shown. The microcapsule 61 comprises a housing 611 and a filling 612 within the housing 611. The housing 611 may be made of a material with good deformation capacity, such as a thermoplastic polyurethane (TPU) elastomer, a natural latex, a natural rubber, etc.

The filling 612 may be, for example, a gas, a liquid, or a gas-liquid mixture. The gas may be, for example, any one of or a mixture of at least two of an inert gas, nitrogen, and carbon dioxide. The liquid may be a supercritical liquid. The gas-liquid mixture may be a gas-liquid equilibrium mixture.

In an exemplary embodiment, a thermoplastic polyurethane elastomer is used as the wall material to manufacture the housing 611, the inert gas Ne is used as the filling 612, and a microencapsulation process is used to fabricate the volume-variable microcapsules 61. The microencapsulation process and materials are controlled and selected to adjust various parameters, such as the size, grain size distribution, deformation modulus index (content of the capsule wall), etc. of the microcapsule product. After the microcapsule 61 is fabricated, a certain amount of (generally a small quantity of) an assistant is added to the microcapsule 61 to prepare products that can be coated and printed. The assistant may contain a volatile solvent and may also contain a fixed solvent to fix the microcapsule on the first substrate, the second substrate, or the sealant structure. In order to prevent the microcapsule from polluting the liquid crystal layer, the fixed solvent may be, for example, a soluble glue or a thermosetting solvent. In the process of coating the sealant structure, a synchronization process can be used to coat the microcapsule product into the peripheral area (sealing area) of the display panel (LCD Panel). After a predetermined time, the volatile solvent in the microcapsule product volatilizes over, and the fixed solvent fixes the microcapsule (e.g., on the substrate). Then, the liquid crystal is loaded and encapsulation is performed, such that the display panel is obtained.

The elasticity coefficient of the microcapsule is related to the material of the capsule wall. Rubber and TPU products can be used as the material for the capsule wall. In an exemplary embodiment, the elasticity modulus is within 1 MPa-1000 MPa, which can be controlled or otherwise selected based on processing and/or material parameters. As noted above, the microcapsule 61 is filled with a filling 612, such as a gas. The microcapsule 61 predictably expands and shrinks under the environment of a negative pressure and a positive pressure, respectively. The size of the microcapsule 61 can be controlled, generally, by use of existing microcapsule technology. In an exemplary embodiment, the size of the microcapsule 61 is controlled to be between 0.01 µm and 10 µm. The specific size of the microcapsule can be selected based on the specific cell gap of the LCD panel, and its size may be smaller than the cell gap at the periphery of the panel. Other parameters (e.g., size, distribution, content of the capsule wall material) of the microcapsule 61 can be controlled and selected through the choice of material for the capsule wall and by the microencapsulation process.

In an exemplary embodiment, during the coating process, the microcapsule product can be in contact with the sealant structure, such that the microcapsule is adhered and fixed to the periphery of the display panel by the sealant, thereby preventing the microcapsule from breaking off which could result in pollution of the liquid crystal.

The exemplary embodiments disclosed herein are effective in reducing the requirement on the deformation capacity of the spacer due to the liquid crystal margin by arranging a volume-variable structure between the two substrates of the display panel, which is favorable for improving the surface strength of the display panel. Furthermore, the design of the spacer between the two substrates can also be simplified. For example, a normal spacer design can be employed, wherein the spacer between the substrates only uses one height, such that by means of the volume-variable structure, the surface strength of the display panel can be improved at the same time of realization of the liquid crystal margin specification. Additionally, a spacer design with different sizes (Triple spacer) can also be employed, which can reduce the corresponding segment difference so as to reduce difficulty of the process, and the surface strength of the display panel can be improved at the same time of realization of the liquid crystal margin specification.

In an exemplary embodiment, a display device comprises the above display panel. The display device may be any product or component having a display function, such as a laptop computer, a television, a digital photo frame, a mobile phone, a tablet computer, etc.

The above embodiments are only exemplary of the present invention and the associated general inventive concepts. It should be noted that one of ordinary skill in the art would appreciate that various modifications and substitutions could be made without departing from the spirit and scope of the present invention.

The invention claimed is:

1. A display panel comprising a first substrate, a second substrate, a liquid crystal layer between the first substrate and the second substrate, and a sealant structure for sealing the liquid crystal layer between the first substrate and the second substrate, wherein a volume-variable structure is arranged between the first substrate and the second substrate, and the volume-variable structure is arranged on inner side of the sealant structure and around the liquid crystal layer, wherein the volume-variable structure comprises a plurality of volume-variable microcapsules, each of the microcapsules comprising a housing and a filling within the housing, wherein the filling is at least one of a gas and a liquid, wherein the gas is at least one of an inert gas, nitrogen, and carbon dioxide.

2. The display panel of claim 1, wherein the material of the housing is at least one of a thermoplastic polyurethane elastomer, a natural latex, and a natural rubber.

3. The display panel of claim 1, wherein the microcapsules are fixed on at least one of the first substrate, the second substrate, and the sealant structure.

4. The display panel of claim 1, wherein the microcapsules are spheres, and wherein microcapsules have a diameter of 0.1 µm-10 µm.

5. The display panel of claim 1, wherein a spacer is arranged between the first substrate and the second substrate.

6. A display device comprising a display panel, said display panel comprising a first substrate, a second substrate, a liquid crystal layer between the first substrate and the second substrate, and a sealant structure for sealing the liquid crystal layer between the first substrate and the second substrate, wherein a volume-variable structure is arranged between the first substrate and the second substrate, and the volume-variable structure is arranged on inner side of the sealant structure and around the liquid crystal layer, wherein the volume-variable structure comprises a plurality of volume-variable microcapsules, each of the microcapsules comprising a housing and a filling within the housing, wherein the filling is at least one of a gas and a liquid, wherein the gas is at least one of an inert gas, nitrogen, and carbon dioxide.

7. The display panel of claim 2, wherein a spacer is arranged between the first substrate and the second substrate.

8. The display panel of claim 1, wherein a spacer is arranged between the first substrate and the second substrate.

9. The display device of claim 6, wherein the material of the housing is at least one of a thermoplastic polyurethane elastomer, a natural latex, and a natural rubber.

10. The display device of claim 6, wherein the microcapsules are fixed on at least one of the first substrate, the second substrate, and the sealant structure.

11. The display device of claim 6, wherein the microcapsules are spheres, and wherein microcapsules have a diameter of 0.1 µm-10 µm.

* * * * *